United States Patent [19]

Murakami et al.

[11] Patent Number: 4,933,137

[45] Date of Patent: Jun. 12, 1990

[54] NUCLEAR FUEL ASSEMBLY WITH MEANS FOR RETARDING DETECTOR TUBE WEAR

[75] Inventors: Kazuo Murakami; Kyoichi Yoshigai; Katsutoshi Yamamoto, all of Kobe, Japan

[73] Assignee: Mitsubishi Jukogyo Kabushiki Kaisha, Tokyo, Japan

[21] Appl. No.: 192,176

[22] Filed: May 10, 1988

[30] Foreign Application Priority Data

May 13, 1987 [JP] Japan .................... 62-70182[U]

[51] Int. Cl.$^5$ ............................................. G21C 3/32
[52] U.S. Cl. .................................. 376/434; 376/254; 376/261
[58] Field of Search ............... 376/434, 441, 442, 445, 376/446, 453, 254, 260, 261

[56] References Cited

U.S. PATENT DOCUMENTS

| | | | |
|---|---|---|---|
| 4,684,501 | 8/1987 | Lui | 376/446 |
| 4,751,039 | 6/1988 | Delevallee | 376/261 |
| 4,778,647 | 10/1988 | Gasparro | 376/347 |
| 4,822,558 | 4/1989 | Merkovsky | 376/347 |

Primary Examiner—Donald P. Walsh
Attorney, Agent, or Firm—Jones, Tullar & Cooper

[57] ABSTRACT

An nuclear fuel assembly including an instrumentation tube adapted for insertion of an in-core detector tube and at least two equi-angularly disposed springs for holding the in-core detector tube concentrically within the instrumentation tube to prevent detector tube vibration is related herein. The springs are preferably secured to the inner surface of the instrumentation tube immediately above the bottom nozzle. An extension sleeve may be provided which extends upwardly or downwardly from the bottom nozzle to surroundingly receive the in-core detector tube. This will effectively increase the axial length of the in-core detector tube that is likely to abut the inner surface of the extension sleeve thus rendering the in-core dectector tube less susceptible to wear due to reactor coolant flow induced vibration.

8 Claims, 3 Drawing Sheets

NUCLEAR FUEL ASSEMBLY WITH MEANS FOR RETARDING DETECTOR TUBE WEAR

BACKGROUND OF THE INVENTION

This invention relates to nuclear fuel assemblies and, more particularly, to an improved nuclear fuel assembly including spring means which acts to hold a resilient in-core detector tube concentrically within an instrumentation tube to retard wear imposed on the detector tube due to coolant flow induced vibration.

In most pressurized water reactors, the reactor core is composed of a large number of elongated fuel assemblies which receive support and alignment from upper and lower transversely extending core plates. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles to form an integral fuel assembly. The guide thimbles extend slightly above and below the ends of the fuel rods. Fuel assemblies also employ instrumentation tubes to accommodate a resilient in-core detector tube in which an in-core detector is reciprocalloy movable. The instrumentation tube is located centrally of each fuel assembly and has its lower end secured to the bottom nozzle in alignment with a bore formed in the center thereof.

During reactor operation, the in-core detector is controllably inserted into a selected one of the detector tubes to monitor neutron flux density at selected axial locations. A change-over system functions to selectively insert such in-core detectors into a number of the detector tubes according to a predetermined monitoring schedule. When the detector tube is maintained in the instrumentation tube, it experiences movement, or vibration, relative to the guide tube and the bore in the bottom nozzle. Coolant flow occurring between the bottom nozzle and the lower core plate is a source of vibration and such flow induced vibration is a cause for wear along the detector tube which abuts the surrounding tube or inner circumference of the bore. Such wear can influence the useful life of the in-core detector tube. Once the outer wall of the detector tube has been worn to a certain depth at one location, the tube must be replaced. Therefore, if such wear can be retarded, the useful life of the detector tube can be increased.

Accordingly, it is the principal object of the invention to provide an improved nuclear fuel assembly including spring means which can retard wear imposed on the in-core detector tube by holding the detector tube concentrically within the instrumentation tube.

It is another object of the invention to provide an improved nuclear fuel assembly including an extension sleeve which effectively increases the axial length of an in-core detector tube that will likely abut the surrounding sleeve to thereby retard wear along the tube surface.

It is still another object of the invention to provide an improved nuclear fuel assembly wherein the inner circumferential surface of the bore in the bottom nozzle is formed of a hardened material to decrease the rate of wear in the outer surface of an in-core detector tube so as to prolong the useful life of the detector tube.

SUMMARY OF THE INVENTION

The objects stated above and other related objects in this invention are accomplished by providing an improved fuel assembly for a nuclear reactor having a core region which is bounded by an upper core plate and a lower core plate, comprising: a bottom nozzle for supporting a fuel assembly on the lower core plate in the core region, the bottom nozzle being perforated to allow reactor coolant to flow therethrough; a plurality of guide thimbles extending longitudinally upwardly from the bottom nozzle and having their lower ends attached to the bottom nozzle; a plurality of transverse grids axially spaced along the guide thimbles; a plurality of elongated fuel rods transversely spaced and supported by the grids; a top nozzle attached to the upper ends of the guide thimbles and being perforated to allow the reactor coolant to flow therethrough; an instrumentation tube extending longitudinally upwardly from the bottom nozzle to the top nozzle, the instrumentation tube being adapted for insertion of an in-core detector tube therein, with an annular space being created between the instrumentation tube and the detector tube for passage of the reactor coolant; and spring means disposed in the annular space at an axial location adjacent to the bottom nozzle to hold the detector tube concentrically within the instrumenation tube while allowing the reactor coolant to flow through the spring means in the annular space, thereby rendering the in-core detector tube less susceptible to wear due to coolant flow induced vibration.

BRIEF DESCRIPTION OF THE DRAWINGS

The invention will be better understood from the following detailed description of preferred embodiments of the invention, when taken in conjunction with the accompanying drawings, in which.

DETAILED DESCRIPTION OF THE PREFERRED EMBODIMENTS OF THE INVENTION

Figure 1:
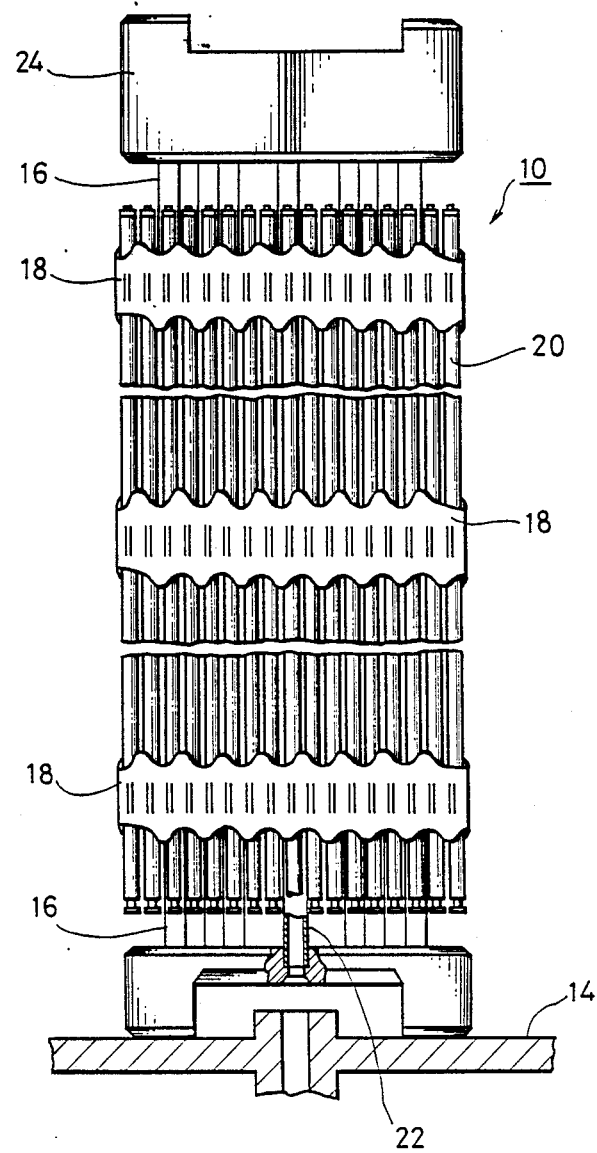
FIG. 1 is an elevational view, partly in section, of a nuclear fuel assembly of conventioanl design.

Referring now to the drawings, and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate 14 in the core region of a reactor (not shown), a number of guide tubes or thimbles 16 protecting longitudinally upward from the bottom nozzle 12, a plurality of transverse grids 18 axially spaced along the guide thimbles 16, an organized array of elongated fuel rods 20 transversely spaced and supported by the grids 18, an instrumentation tube 22 located in the center of the fuel assembly, and an upper end structure or top nozzle 24 attached to the upper ends of the guide thimbles 16. The fuel assembly thus constructed forms an integral unit capable of being conventionally handled without damaging the assembly parts.

As mentioned above, the fuel rods 20 in the array thereof in the assembly 10 are held in spaced relationship with one other by the grids 18 spaced along the fuel assembly length. Each fuel rod 20 includes nuclear fuel pellets (not shown) composed of fissile materials and responsible for creating the reactive power of the nuclear reactor. A liquid moderator/coolant such as water, or water containing boron, is pumped upwardly through a number of flow holes (not shown) formed in the bottom nozzle 12 into the fuel assembly 10 where the water flows around each fuel rod 20, extracting heat generated therein for the production of useful work. The water thus heated flows upwardly through a number of similar flow hole (not shown) formed in the top nozzle 24, exiting from the fuel assembly 10. To control the fission process, a number of control rods (not shown) are reciprocally movable in the guide thimbles 16 located at predetermined positions in the fuel assembly 10.

Figure 2:
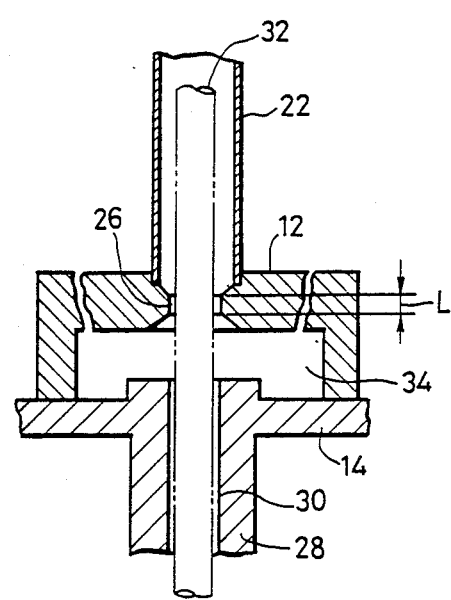
FIG. 2 is an enlarged fragmentary sectional view of the lower end of an instrumentation tube, or a guide thimble adapted for insertion of an in-core detector tube, in the fuel assembly of FIG. 1.

FIG. 2 is an enlarged view of the portion encircled in FIG. 1, illustrating more clearly the association of the instrumentation tube 22, the bottom nozzle 12 and the lower core plate 14 in the conventional arrangement. As shown, the lower end of the instrumentation tube 22 is secured to the top surface of the bottom nozzle 12 in alignment with a bore 26 therein in a suitable manner, such as, by welding. The lower core plate 14 includes a plurality of support columns 28 each having formed therein a through hole 30 for accommodating a resilient in-core detector tube 32 therein. The through hole 30 is disposed in alignment with the bore 26 in the bottom nozzle 12 to permit the resilient in-core detector tube 32 to be inserted through the instrumentation tube 22 upwardly. The in-core detector tube 32 serves as a conduit for protecting and guiding an in-core neutron flux detector (not shown) into the reactor core to measure the neutron flux density as a function of the detector's position along the axial length of the core to thereby determine the axial power distribution of the reactor core in cooperation with a number of ex-core detectors disposed around the reactor core.

It is seen from FIG. 2 that because of the resilient nature of the in-core detector tube 32, it often comes into abutting engagement with the inner circumferential surface of the bore 26. Since there is a coolant flow within a space 34 defined between the bottom nozzle 12 and the lower core plate 14, the in-core detector tube 32 is prone to vibrate under the influence of the coolant flow. This flow-induced vibration is a source of wear along the surface of the tube length which often abuts the inner circumferential surface of the bore 26, as represented by L. Such wear can influence the useful life of the in-core detector tube.

In accordance with the teachings of this invention, there is provided an improved arrangement for frictionally retaining the in-core detector tube against lateral movement thereof to prevent tube vibration, thereby substantially increasing wear resistance and, as a result useful life of the in-core detector tube.

Figure 3:
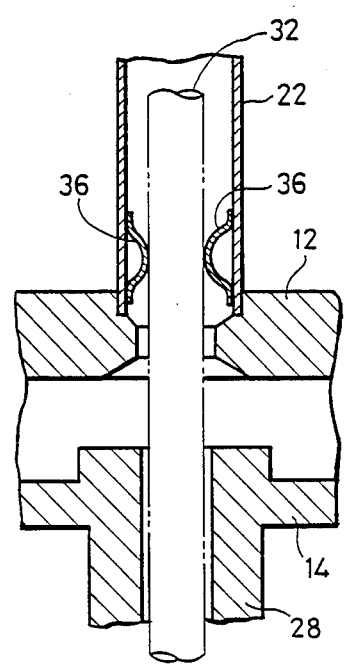
FIG. 3 is an enlarged fragmentary sectional view similar to FIG. 2, but showing a pair of diametrically opposed springs for holding the in-core detector tube concentrically within the instrumentation tube according to a first embodiment of the invention.

FIG. 3 is an enlarged view similar to FIG. 2, but showing a first embodiment of the invention. As shown, the instrumentation tube 22 includes at least two diametrically opposed springs 36 which are secured to the inner surface of the instrumentation tube as by welding, at an axial location immediately above the lower end thereof. Such equi-angularly disposed springs 36 frinctinally engage or contact the resilient in-core detector tube 32 and serve to hold the in-core detector tube precisely concentrically within the instrumentation tube 22 so as to maintain the spacing between the outer circumference of the in-core detector tube and the inner circumferential surface of the bore 36. Accordingly, it should be understood that the in-core detector tube 32 is much less susceptible to wear due to coolant flow induced vibration than in the conventional fuel assembly and hence the useful life of the in-core detector tube will be substantially increased.

Figure 4:
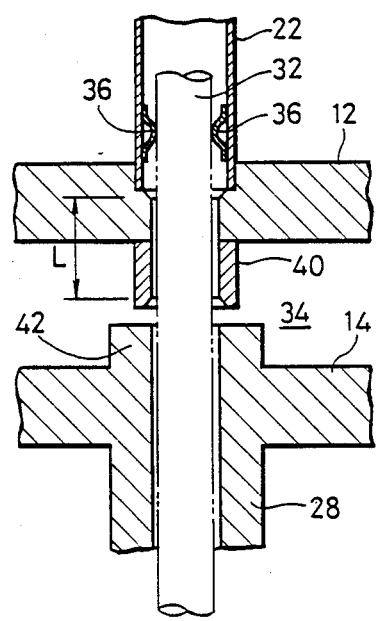
FIG. 4 is an enlarged fragmentary sectional view of a second embodiment of the invention, showing an additional extension sleeve extending downwardly from the bottom nozzle to surroundingly receive the in-core detector tube.

FIG. 4 illustrates a second embodiment of the invention which differs from that of FIG. 3 in the provision of an additional extension sleeve 40 which surrounds a major portion of the axial length of the in-core detector tube 32 within the space 34. The extension sleeve 40 is secured at its upper end to the lower surface of the bottom nozzle 12 and extends downwardly with a gap left between the lower end thereof and the upper end of the support column 28 that protrudes upwardly from the upper surface of the bottom nozzle 12. It is to be noted that the use of such an extension sleeve will render the in-core detector tube 32 less susceptible to coolant flow induced vibration and accordingly retard the wear process. In addition, the extension sleeve 40 effectively increases the axial length of the in-core detector tube 32 along which the outer circumference thereof will likely come into abutting engagement with the surrounding surface of the bore or the extension sleeve. Once the outer surface of an in-core detector tube has teen worn to a certain depth at one location, the tube must be replaced. Therefore, it is to be understood that such wear can be retarded by increasing the axial length L of the tube portion which is likely to contact the surrounding surface of the bore or sleeve.

Figure 5:
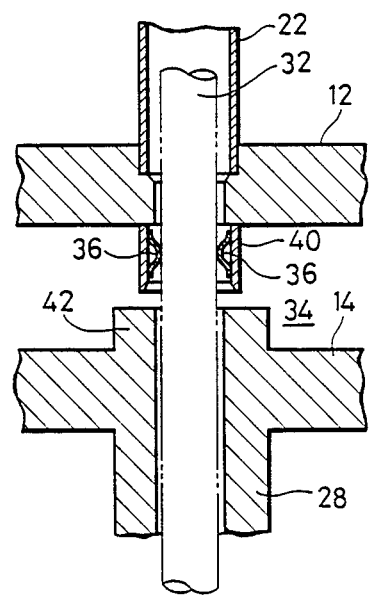
FIG. 5 is an enlarged fragmentary sectional view of a third embodiment of the invention, showing a pair of diametrically opposed springs provided in the extension sleeve.

In the illustrated embodiment, the springs 36 are disposed within the instrumentation tube 22 at the same axial location as in the embodiment of FIG. 2, i.e., immediately above the lower end of the instrumentation tube 22. However, as shown in FIG. 5 which illustrates a third embodiment of the invention, such springs may be provided within the extension sleeve 40 rather than within the instrumentation tube 22. Or alternatively, two sets of such springs may be disposed within both the instrumentation tube and the extension sleeve.

Figure 6:
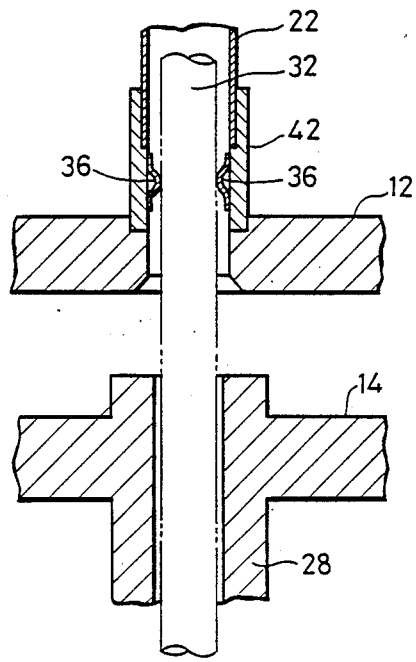
FIG. 6 is an enlarged fragmentary sectional view of a fourth embodiment of the invention, showing an additional extension sleeve extending upwardly from the bottom nozzle and including a pair of diametrically opposed springs provided in the sleeve.

FIG. 6 illustrates a fourth embodiment of the invention. In this modification, a similar extension sleeve 42 extends upwardly from the top surface of the bottom nozzle 12 and at least two diametrically opposed spring 36 are disposed within the extension sleeve 42 to hold the in-core detector tube 32 concentrically within the instrumentation tube 22. The lower end of the instrumentation tube 22 is fitted into the upper end of the extension sleeve 42 and is secured thereto in a suitable manner, for example, by welding.

Figure 7:
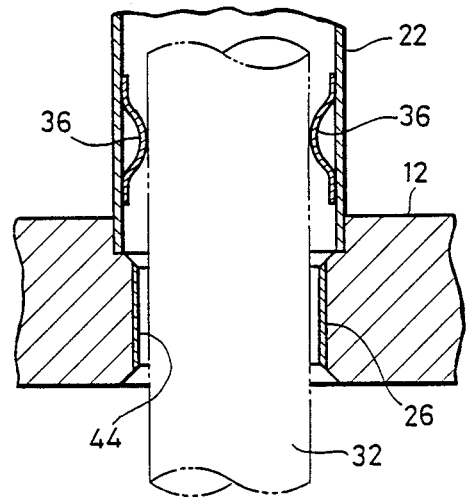
FIG. 7 is an enlarged fragmentary sectional view of a fifth embodiment of the invention, showing the provision of a hardened layer in the inner circumference of the bore in the bottom nozzle to retard detector tube wear.

FIG. 7 illustrates a fifth embodiment of the invention which is different from the FIG. 3 embodiment in the provision of a hardened layer 44 in the inner circumferential surface of the bore 26 through which the detector tube 32 is inserted. Such hardened layer may be formed by utilizing certain known plating or coating techniques. It will be well recognized that if the material of the inner circumferential surface is softer, the detector tube surrounded thereby is more susceptible to wear. Thus, to form a hardened layer in the inner circumferential surface of the bore 36 will retard such wear and accordingly increase the useful life of the in-core detector tube 32. It is to be noted that the provision of such a hardened layer in the inner circumferential surface of the bottom nozzle bore and the extension sleeve in other embodiments is also within the purview of the present invention.

To summarize the present invention, the in-core detector tube 32 is normally held concentrically within the instrumentation tube 22 by means of at least two diametrically opposed springs 36 provided in the interior of the instrumentation tube. Accordingly, the in-core detector tube 32 is much less subject to the influence of reactor colant flow than in the prior art arrangement without such springs, and thus the tube is much less susceptible to wear due to such flow induced vibration. Moreover, the use of an extension sleeve will effectively increase the axial length of the in-core detector tube along which its outer surface is likely to contact the surroudning sleeve or bottom nozzle bore, which will further retard such wear substantially. Also, if the inner circumferential surface of the bore or the extension sleeve is hardened by plating or coating or the like, such wear in the in-core detector tube will still further be retarded, resulting in a substantial increase in the useful life of the in-core detector tube.

Numerous features and advantates of the invention have been set forth in the foregoing description, together with details of structure and function of the invention. The disclosure, however, is illustrative only, and changes may be made in detail without deviating from the true scope of the invention.

What is claimed is:

1. A fuel assembly for a nuclear reactor having a core region which is bounded by an upper core plate and a lower core plate, comprising:
   a bottom nozzle for supporting a fuel assembly on the lower core plate in the core region, the bottom nozzle being perforated to allow reactor coolant to flow therethrough;
   a plurality of guide thimbles extending longitudinally upwardly from the bottom nozzle and having their lower ends attached to the bottom nozzle;
   a plurality of transverse grids axially spaced along the guide thimbles;
   a plurality of elongated fuel rods transversely spaced and supported by the grids;
   a top nozzle attached to the upper ends of the guide thimbles and being perforated to allow the reactor coolant to flow therethrough;
   an instrumentation tube extending longitudinally upwardly from the bottom nozzle to the top nozzle, the instrumentation tube being adapted for insertion of an in-core detector tube therein, with an annular space being created between the instrumentation tube and the detector tube for passage of the reactor coolant; and
   spring means disposed in the annular space at an axial location adjacent to the bottom nozzle to hold the detector tube concentrically within the instrumentation tube while allowing the reactor coolant to flow through the spring means in the annular space, thereby rendering the in-core detector tube less susceptible to wear due to coolant flow induced vibration.

2. A fuel assembly as set forth in claim 1 wherein the spring means comprises at least two springs disposed equi-angularly around the in-core detector tube.

3. A fuel assembly as set forth in claim 2 wherein the springs are secured to the inner surface of the instrumentation tube.

4. A fuel assembly as set forth in claim 1, further comprising an extension sleeve extending downwardly from the lower surface of the bottom nozzle to surroundingly receive the in-core detector tube therein.

5. A fuel assembly as set forth in claim 4 wherein the spring means comprises at least two springs disposed equi-angularly around the in-core detector tube, the springs being secured to the inner surface of the extension sleeve.

6. A fuel assembly for a nuclear reactor having a core region which is bounded by an upper core plate and a lower core plate, comprising:
   a bottom nozzle for supporting a fuel assembly on the lower core plate in the core region, the bottom nozzle being perforated to allow reactor coolant to flow therethrough;
   a plurality of guide thimbles extending longitudinally upwardly from the bottom nozzle and having their lower ends attached to the bottom nozzle;
   a plurality of transverse grids axially spaced along the guide thimbles;
   a plurality of elongated fuel rods transversely spaced and supported by the grids;
   a top nozzle attached to the upper ends of the guide thimbles and being perforated to allow the reactor coolant to flow therethrough;
   an instrumentation tube extending longitudinally downwardly from the top nozzle toward the bottom nozzle, the instrumentation tube being adapted for insertion of an in-core detector tube therein, with an annular space being created between the instrumentation tube and the detector tube for passage of the reactor coolant;
   an extension sleeve extending longitudinally upwardly from the bottom nozzle in alignment with the instrumentation tube, the upper end of the extension sleeve being attached to the lower end of the instrumentation tube; and
   spring means secured to the inner surface of the extension sleeve at an axial location adjacent to the bottom nozzle to hold the detector tube concentrically within the instrumentation tube while allowing the reactor coolant to flow through the spring means in the annular space, thereby rendering the in-core detector tube less susceptible to wear due to coolant flow induced vibration.

7. A fuel assembly as set forth in claim 6 wherein the spring means comprises at least two springs disposed equi-angularly around the in-core detector tube.

8. A fuel assembly as set forth in claim 1 whererin the bottom nozzle includes a plurality of bores formed therein to accommondate in-core detector tubes, each bore having a hardened layer formed in the inner circumference thereof for retarding wear which might occur in the in-core detector tube due to coolant flow induced vibration.

* * * * *